(12) United States Patent
Miura

(10) Patent No.: US 10,116,829 B2
(45) Date of Patent: Oct. 30, 2018

(54) INFORMATION PROVIDING SYSTEM BY DATA RELAYING APPLICATION

(71) Applicant: STAR MICRONICS CO., LTD., Shizuoka-shi (JP)

(72) Inventor: Koji Miura, Shizuoka (JP)

(73) Assignee: STAR MICRONICS CO., LTD., Shozuoka-Shi (JP)

( * ) Notice: Subject to any disclaimer, the term of this patent is extended or adjusted under 35 U.S.C. 154(b) by 0 days.

(21) Appl. No.: 15/648,601

(22) Filed: Jul. 13, 2017

(65) Prior Publication Data
US 2017/0310845 A1 Oct. 26, 2017

Related U.S. Application Data

(63) Continuation of application No. PCT/JP2016/055784, filed on Feb. 26, 2016.

(30) Foreign Application Priority Data

Jul. 13, 2015 (JP) .................................. 2015-139364

(51) Int. Cl.
*G06F 3/12* (2006.01)
*H04N 1/32* (2006.01)
(Continued)

(52) U.S. Cl.
CPC .......... *H04N 1/32133* (2013.01); *B41J 29/38* (2013.01); *G06F 3/1204* (2013.01);
(Continued)

(58) Field of Classification Search
CPC .................................................. H04N 1/32133
See application file for complete search history.

(56) References Cited

U.S. PATENT DOCUMENTS 8,412,781 B2 * 4/2013 Sugawara ........... H04L 12/5875
709/206
9,122,429 B1 * 9/2015 Cecile .................... G06F 3/1204
(Continued)

FOREIGN PATENT DOCUMENTS

EP        2720138         4/2014
JP        2003-131857     5/2003
(Continued)

OTHER PUBLICATIONS

Anonymous: "Intent (Android)", Wikipedia.
EPO, Supplementary Extended European Search Report of Application No. 16824098.4, dated Aug. 23, 2018.

*Primary Examiner* — Ted Barnes
(74) *Attorney, Agent, or Firm* — Lex IP Meister, PLLC

(57) ABSTRACT

Information on printer maintenance or an updating of software is notified without giving uncomfortable feeling to a user by an unintentional change of screen displays. The invention comprises an application activating unit which issues an application binding command in response to a print instruction of a data generated by an application executed by a mobile, an additional information acquiring unit which acquires an additional information according to a predetermined information acquiring command included in the application binding command when a print result information is acquired from the printer, and an information providing unit which provides the mobile with the additional information in addition to the print result information. A user is notified of necessary information on printer maintenance or an updating of software in addition to the print result information upon completion of printing intentionally instructed by the user.

6 Claims, 4 Drawing Sheets

(51) Int. Cl.
  *B41J 29/38* (2006.01)
  *H04N 1/00* (2006.01)
  *B41J 29/00* (2006.01)

(52) U.S. Cl.
  CPC .......... *G06F 3/1207* (2013.01); *G06F 3/1229* (2013.01); *G06F 3/1292* (2013.01); *H04N 1/00307* (2013.01); *H04N 1/00408* (2013.01); *H04N 1/00477* (2013.01); *H04N 1/00832* (2013.01); *H04N 1/00973* (2013.01); *B41J 29/00* (2013.01); *H04N 2201/0072* (2013.01); *H04N 2201/0082* (2013.01)

(56) References Cited

U.S. PATENT DOCUMENTS

| | | | | |
|---|---|---|---|---|
| 2004/0021895 | A1* | 2/2004 | Lay | H04N 1/00209 358/1.15 |
| 2005/0151881 | A1* | 7/2005 | Yamaguchi | H04N 1/00291 348/552 |
| 2006/0066889 | A1* | 3/2006 | Asano | H04L 51/066 358/1.15 |
| 2006/0178952 | A1* | 8/2006 | Harris | G06F 17/3089 705/26.1 |
| 2007/0005845 | A1 | 1/2007 | Abe | |
| 2007/0035771 | A1* | 2/2007 | Kitamaru | H04N 1/00238 358/1.18 |
| 2007/0038718 | A1* | 2/2007 | Khoo | G06Q 10/107 709/206 |
| 2007/0086051 | A1* | 4/2007 | Kunori | H04N 1/00127 358/1.15 |
| 2007/0159650 | A1 | 7/2007 | Takamatsu et al. | |
| 2008/0248828 | A1* | 10/2008 | Tomiyasu | H04M 1/72522 455/550.1 |
| 2010/0085602 | A1* | 4/2010 | Okada | H04N 1/00411 358/1.18 |
| 2011/0255111 | A1* | 10/2011 | Oba | G06F 3/1247 358/1.13 |
| 2011/0312377 | A1* | 12/2011 | Silverbrook | B41J 3/445 455/556.1 |
| 2012/0109761 | A1* | 5/2012 | Roquemore | G06Q 20/204 705/17 |
| 2013/0157647 | A1* | 6/2013 | Kolodziej | H04W 4/046 455/419 |
| 2014/0025779 | A1* | 1/2014 | Matsumoto | G06Q 20/202 709/217 |
| 2014/0063542 | A1* | 3/2014 | Aoki | G06F 3/1296 358/1.15 |
| 2014/0153017 | A1* | 6/2014 | Watanabe | G06F 3/1212 358/1.13 |
| 2014/0204403 | A1* | 7/2014 | Young | G06F 3/1293 358/1.14 |
| 2014/0355035 | A1* | 12/2014 | Yamada | G06F 3/1238 358/1.14 |
| 2014/0355047 | A1* | 12/2014 | Lee | G06F 3/1292 358/1.15 |
| 2015/0036182 | A1* | 2/2015 | Nakamura | G06F 3/1207 358/1.15 |
| 2015/0153975 | A1* | 6/2015 | Mori | G06F 3/1206 358/1.14 |
| 2015/0205559 | A1* | 7/2015 | Miyata | G06F 3/1207 358/1.15 |
| 2016/0110138 | A1* | 4/2016 | Miyata | G06F 3/1207 358/1.15 |
| 2016/0139865 | A1* | 5/2016 | Takamoto | G06K 15/1836 358/1.15 |
| 2016/0191780 | A1* | 6/2016 | Li | H04N 5/77 348/211.3 |
| 2016/0378410 | A1* | 12/2016 | Inoue | G06F 3/1236 358/1.15 |
| 2017/0083800 | A1* | 3/2017 | Takamoto | G06K 15/1836 |
| 2017/0104895 | A1* | 4/2017 | Kim | H04N 1/00973 |
| 2017/0199710 | A1* | 7/2017 | Ando | G06F 3/1222 |
| 2017/0223127 | A1* | 8/2017 | Matsutani | H04L 67/26 |

FOREIGN PATENT DOCUMENTS

| | | |
|---|---|---|
| JP | 2006-293654 | 10/2006 |
| JP | 2013-214228 | 10/2013 |
| JP | 2014-021717 | 2/2014 |
| JP | 2014-178983 | 9/2014 |
| JP | 2014-215927 | 11/2014 |
| WO | 2006/001157 | 1/2006 |

* cited by examiner

INFORMATION PROVIDING SYSTEM BY DATA RELAYING APPLICATION

CROSS-REFERENCE TO RELATED APPLICATION

This application is a continuation of International Patent Application No. PCT/JP2016/055784, filed on Feb. 26, 2016, which claimed priority of Japanese Patent Application No. 2015-139364 filed on Jul. 13, 2015. The contents of these applications are incorporated herein by reference in their entirety.

BACKGROUND

(a) Field

The present invention relates to an information providing system by a data relaying application, especially to a system which controls provision of information to a mobile by a data relaying application activated by an application binding technology when execution of printing is instructed by the mobile.

(b) Description of the Related Art

Conventionally, a system is provided in which a mobile such as a smart phone and a tablet is used to issue a print instruction to the printer. The mobile has an application for execution of printing ("a printing application") provided from a printer manufacturer installed. Any HTML data generated by an application executed by the mobile ("an application in use") is converted into corresponding raster data to be transmitted to the printer according to a printing command recognizable by the printer. The printing application functions as a data relaying application which relays data from the application executed by the mobile to the printer.

In iOS, however, a time-taking task such as printing data transmission is prohibited to run in the background. When a print instruction is given in the application executed by the mobile, a series of processing needs to run in the foreground. The series of processing includes activation of the printing application, conversion of data, and transmission to the printer. Technology called a URL scheme is used to execute the processing.

The instruction is sent from the mobile to the printer by using an application binding technology allowing a user to bind the functions of different applications. The application binding technology is called a URL scheme in iOS and an Intent in Android. In Japanese Patent Application Laid-Open Publication No. 2014-215927, when a user intends to do something in an application executed by a mobile, other applications available for the purpose are listed on the screen. The user selects a desired one, for example, a printing application for execution of printing from the listed applications.

When the printing application is executed, a result and an error if any is notified to the mobile from the printer via the printing application. The user knows whether execution of printing is successfully done on the screen display of the mobile In Japanese Patent Application Laid-Open Publication No. 2014-21717, an application activating order is issued by using a URL scheme. For example, an application activating button has a setting of a URL scheme ("ABC://") designating an application name ("ABC") corresponding to an advertisement of the application. Clicking the button activates the application "ABC" installed in the smart phone. Further, when the URL scheme contains a parameter to be handed to the application, clicking the button allows the parameter to be handed to the application "ABC".

In Japanese Patent Application Laid-Open Publication No. 2014-178983, an operation to be executed can be designated by using a URL scheme having a format of "a description of URL, a description of HTML?a description of operation". For example, a description of "assist://ABCDEF?Wi-Fi=ON" is embedded in a webpage providing a manual of the mobile where "ABCDEF" is a name of an application and "Wi-Fi=ON" is an instruction to set Wi-Fi on. The mobile reads an application corresponding to "ABCDEF" described before "?" and then generates an operation order corresponding to "Wi-Fi=ON" described after "?".

SUMMARY

A printing failure results from various factors including a network error between the mobile and the printer, paper out, and paper jam. A failure is sometimes caused by a component life of printer components such as a paper cutter and a motor. The failure caused by network error, paper out, or paper jam cannot be expected, but the component life can be expected.

In a conventional application binding technology, however, an error is notified only when execution of printing fails as a result of an activation of the printing application in response to a print instruction. It is difficult for a user to predict such a situation as an error possibly occurs and to maintain or replace the components for error prevention.

It would be possible to predict the component life by a regular process of polling executed by the mobile to sample the status of the printer. The process of polling, however, needs a polling application (or a printing application) to be activated in the foreground. The screen display of the application executed by the mobile would be suddenly replaced by a screen display of the application activated in the foreground, giving uncomfortable feeling to the user.

The problem also resides in an updating of firmware or an updating of printing application. An updated version of firmware or printing application is released at irregular intervals. The printer has desirably the latest version installed as soon as released. It is, however, difficult for the user to timely execute the updating without knowledge of the release since only a result and/or an error is notified when a print instruction is sent from the mobile by using the application binding technology.

It would be possible to timely update the version by a regular process of polling executed by, for example the printing application to sample the latest version of firmware or the printing application from the external server and to notify the user if required. The process of polling, however, needs a printing application to be executed in the foreground. The screen display in the application executed by the mobile would be suddenly replaced by a screen display of the application activated in the foreground, giving uncomfortable feeling to the user.

The present application provides a system capable of executing a printing in response to a print instruction from a mobile by using application binding technology, where necessary information on printer maintenance or an updating of software is notified without giving uncomfortable feeling to the user by an unintentional change of screen displays.

In the invention, when a print instruction is given in an application executed by a mobile, an application binding command is issued. The application binding command designates a printing application (a data relaying application) and a predetermined information acquiring command. The designated application is thereby activated and execution of printing by the printer is thereby controlled. When a print result is acquired from the printer, additional information relating to at least one of the printer and the printing application is acquired too according to the information acquiring command. The additional information added to the print result is notified to the user.

According to the invention, necessary information on printer maintenance or an updating of software is notified to the user as additional information added to the print result which is generally notified to the user upon completion of printing. The additional information is notified to the user upon completion of printing when execution of printing is intentionally instructed by the user to activate the printing application by the application binding command An application intentionally executed is not interrupted by an unintentional acquisition of information in another application activated in the foreground via a regular process of polling. Necessary information on printer maintenance or an updating of software is notified as the additional information without giving uncomfortable feeling to the user by an unintentional change of screen displays.

DETAILED DESCRIPTION

Figure 1:
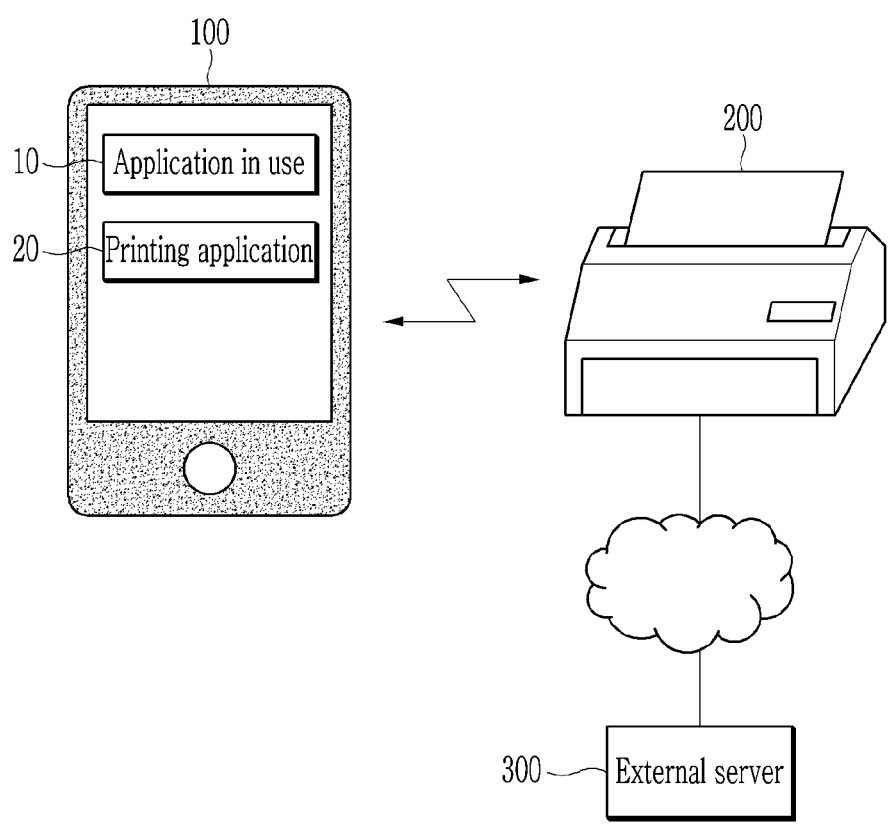
FIG. 1 is an example of a printing system using an information providing system by a data relaying application of an embodiment.

An embodiment of the present invention is being described referring to the drawings. FIG. 1 is an example of a printing system using an information providing system by a data relaying application of the embodiment. The printing system comprises a mobile 100, a printer 200, and an external server 300. The mobile 100 may be a smart phone or a tablet. The mobile 100 may be connected to the printer 200 via Wi-Fi or Bluetooth (Registered Trademark) for bi-directional wireless communication. The mobile 100 may be connected to the external server 300 via a communication network such as Internet.

The mobile 100 has an application 10 and a printing application 20 installed. The application 10 is capable of generating and displaying HTML (HyperText Markup Language) data. The printing application 20 is capable of converting the generated HTML data into raster data to be transmitted to the printer 200. The HTML data generated by the application 10 is thereby printed by the printer 200. The application 10 corresponds to "an application executed by a mobile" as claimed. The application 10 is called the application in use 10. The application in use 10 may be an iOS application. The printing application 20 may be an iOS application.

The printing application 20 converts the HTML data generated by the application in use 10 into the raster data for printing. The printing application 20 transmits the raster data to the printer 200 according to the printing command recognizable by the printer 200. As described, a print instruction from the mobile 100 is executed.

The mobile 100 acquires general information on a print result including success or failure of execution of printing and the content of an error and further additional information on printer maintenance and an updating of software.

The information providing system of the invention acquires the additional information and notifies the user of the acquired additional information. The information providing system comprises the application in use 10 installed in the mobile 100, the printing application 20 installed in the mobile 100, and software installed in the printer 200. Maintenance information has been previously acquired by the printer 200 by internal processing. Updating information has been previously acquired from the external server 300 and stored in the printer 200.

Figure 2:
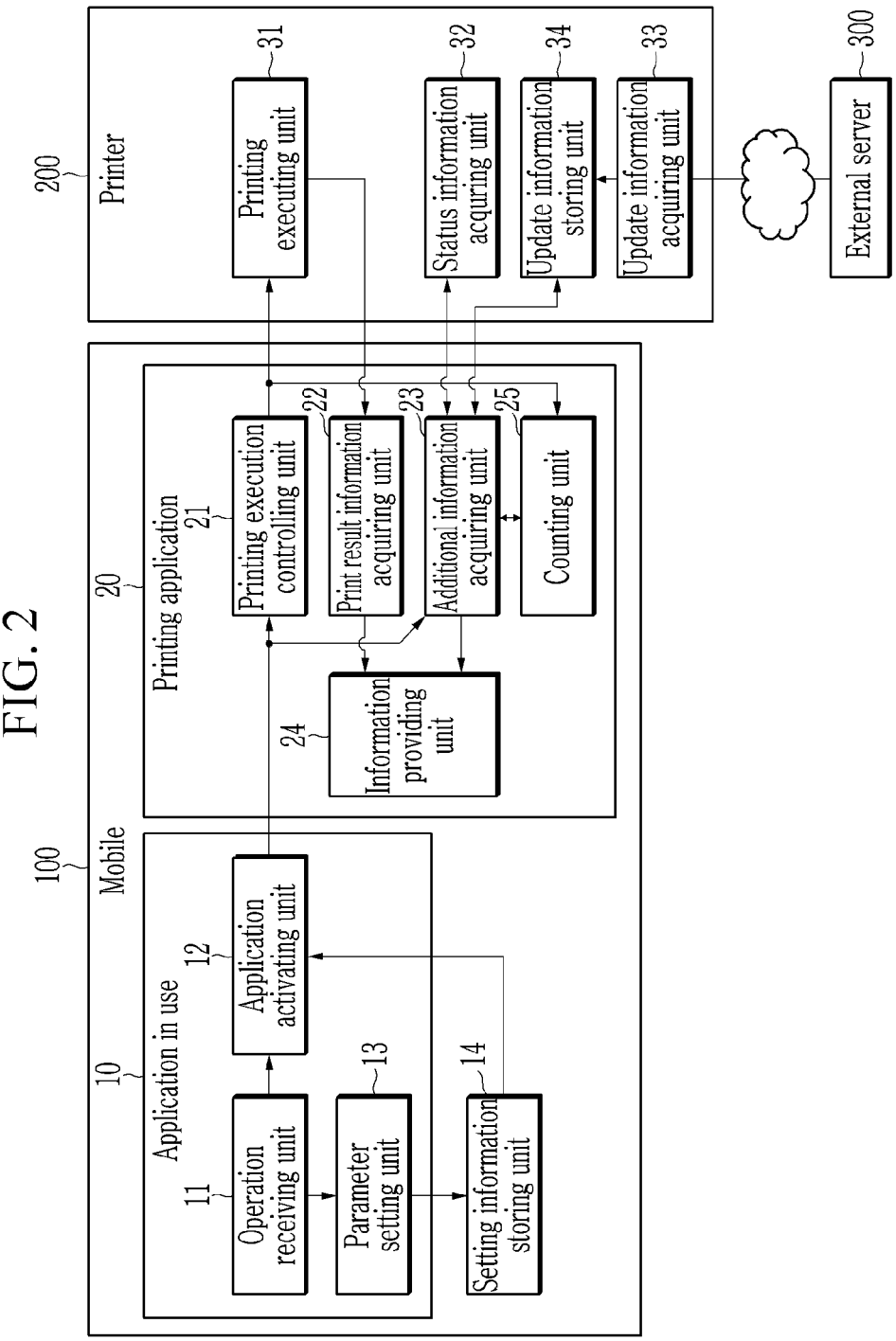
FIG. 2 is a functional block diagram of the printing system using the information providing system of the embodiment.

FIG. 2 is a functional block diagram of the printing system of the embodiment. The printing system comprises an operation receiving unit 11, an application activating unit 12, a parameter setting unit 13, a setting information storing unit 14, a printing execution controlling unit 21, a print result information acquiring unit 22, an additional information acquiring unit 23, an information providing unit 24, a counting unit 25, a printing executing unit 31, a status information acquiring unit 32, an update information acquiring unit 33, and an update information storing unit 34.

The operation receiving unit 11, the application activating unit 12, and the parameter setting unit 13 are provided by the application in use 10. The printing execution controlling unit 21, the print result information acquiring unit 22, the additional information acquiring unit 23, the information providing unit 24, and the counting unit 25 are provided by the printing application 20. The printing executing unit 31, the status information acquiring unit 32, and the update information acquiring unit 33 are provided by software of the printer 200.

The function of each of the blocks 11 to 13 may be realized by a CPU which executes a program of the application in use 10 stored in a storage device such as a RAM, a ROM, a hard disc, and a semiconductor memory. The function of each of the blocks 21 to 25 may be realized by a CPU which executes a program of the printing application 20 stored in a storage device such as a RAM, a ROM, a hard disc, and a semiconductor memory. The function of each of the blocks 31 to 33 may be realized by a CPU which executes a program stored in a storage device such as a RAM, a ROM, a hard disc, and a semiconductor memory. Part of the functional blocks 11 to 13, 21 to 25, and 31 to 33 may be constituted by hardware or DSP (Digital Signal Processor).

The operation receiving unit 11 receives a user operation instructing execution of printing of the HTML data generated by the application in use 10 ("a printing executing operation"). The operation receiving unit 11 also receives a user operation setting a parameter of an information acquiring command included in an application binding command ("a parameter setting operation") as described later. The parameter designates a type of information to be acquired and a frequency of acquisition.

The parameter setting unit 13 stores the parameter set by the parameter setting operation in the setting information storing unit 14. The application activating unit 12 issues the application binding command designating the printing application 20 and the predetermined information acquiring command (a query character string) according to the parameter stored in the setting information storing unit 14 when the printing execution operation is received by the operation receiving unit 11.

The application binding command uses a URL scheme since the mobile 100 in this embodiment is iOS-based. The application activating unit 12 activates the printing application 20 by issuing the application binding command in the format of: [a name of a printing application]://print/?html=<HTML data>&[information acquiring command] where the portion of "[a name of a printing application]://" represents the URL scheme.

The invention is characterized by "&[information acquiring command]" added to the end of the URL scheme. The predetermined information acquiring command includes at least one of a command for acquiring information on a status of the printer 200, a command for acquiring information on latest version of firmware of the printer 200, and a command for acquiring information on latest version of the printing application 20. The status of the printer 200 includes a life of a component such as a paper cutter and a motor for which some maintenance work is required.

When the name of the printing application is "PassPRNT" and the HTML data has a file name of "Receipt data", the application binding command may be in the format of:
PassPRNT://print/?html=<Recept data>&info=maintenance
where "info=maintenance" preceded by "&" represents the information acquiring command. The HTML data may be actual data or a URL to which data is downloaded.

The information acquiring command on latest version of firmware of the printer 200 is "info-firmware". The information acquiring command on latest version of the printing application 20 is "info-application". A plurality of commands may be coupled by "&" to acquire two or more pieces of information.

When the parameter of the frequency of acquisition is stored in the setting information storing unit 14, a command for designating the frequency of acquisition is further included in the application binding command. The frequency of acquisition may be set according to, for example, the number of printed sheets or an amount of time. Acquisition of information may be executed every "N" sheets (where "N" may be 1 or more) or every "x" hour or "x" day (where "x" may be any number). The information acquiring command on the printer status designating every 10 sheets may be in the format of:
Inforepetition=10print&info=maintenance The printing execution controlling unit 21 of the printing application 20 activated by the application activating unit 12 controls execution of printing by the printer 200. The printing execution controlling unit 21 converts the HTML data designated by <Receipt data> into the raster data according to part of the application binding command designating "print/?html=<Receipt data>", and then transmits the raster data to the printer 200 according to the printing command recognizable by the printer 200. The printing execution controlling unit 21 notifies the counting unit 25 of the number of printed sheets.

The printing executing unit 31 of the printer 200 executes a printing upon receipt of instruction from the printing execution controlling unit 21 of the mobile 100. Upon completion of printing, the printing executing unit 31 returns information on the print result including success or failure and the content of error. The print result information acquiring unit 22 acquires the information transmitted from the printing executing unit 31.

The additional information acquiring unit 23 acquires information on at least one of the printer 200 or the printing application 20 according to the information acquiring command included in the application binding command issued by the application activating unit 12.

When the information acquiring command on the status of the printer 200 is included, the additional information acquiring unit 23 requests the printer 200 to acquire information on the status of the printer 200. The status information acquiring unit 32 of the printer 200 acquires information on the status thereof in response to the request. Specifically, the status information acquiring unit 32 uses a known maintenance command to acquire information on the status of the paper cutter, the motor and others. The acquired information is transmitted to the mobile 100. The additional information acquiring unit 23 of the printing application 20 acquires the transmitted information as the additional information.

When the information acquiring command on latest version of firmware of the printer 200 is included, the additional information acquiring unit 23 requests the printer 200 to acquire information on the latest version of firmware. The information on latest version has been acquired by the update information acquiring unit 33 from the external server 300 via Internet and stored in the update information storing unit 34. The additional information acquiring unit 23 acquires the stored information as the additional information.

When the information acquiring command on latest version of the printing application 20 is included, the additional information acquiring unit 23 requests the printer 200 to acquire information on the latest version of the printing application 20. The information on latest version has been acquired by the update information acquiring unit 33 from the external server 300 via Internet and stored in the update information storing unit 34. The additional information acquiring unit 23 acquires the stored information as the additional information.

The update information acquiring unit 33 regularly accesses the external server 300 via Internet to acquire information on latest version of firmware of the printer 200 or latest version of the printing application 20. The acquired information is stored in the update information storing unit 34. The update information acquiring unit 33 may acquire the information only when an updated version is stored in the external server 300.

When a command for designating the frequency of acquisition is included, the counting unit 25 counts the number of printed sheets or amount of time accumulated since the additional information is acquired. When the designated frequency is reached, the additional information acquiring unit 23 acquires the additional information from the printer 200 and then the counting unit 25 resets the count to zero.

When the frequency is designated by the number of printed sheets, for example, the counting unit 25 counts the number of printed sheets from zero according to a notification from the printing execution controlling unit 21 everytime a sheet is printed. When designated by the amount of time, the counting unit 25 counts the time from zero. Upon reaching the designated frequency, the additional information acquiring unit 23 acquires from the printer 200 the additional information of the type as designated by the information acquiring command.

Figure 3:
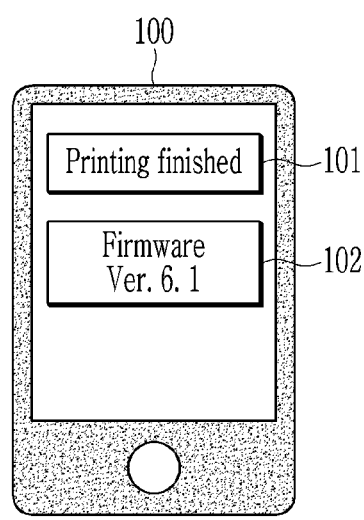
FIG. 3 is an example of a screen display of a mobile.

The information providing unit 24 provides the additional information acquired by the additional information acquiring unit 23 in addition to the print result information acquired by the print result information acquiring unit 22. Specifically, the screen display of the mobile 100 shows the print result information and the additional information. FIG. 3 is an example of the screen display. The mobile 100 shows a piece of print result information 101 and an piece of additional information 102. The print result information 101 is a "printing finished" and the additional information 102 is an latest version of firmware.

In the invention, as described above, in response to a print instruction of the data generated by the application executed by the mobile, the application binding command, which designates the printing application and the predetermined information acquiring command, is issued to thereby activate the designated application and control execution of printing by the printer. When a print result is acquired and provided to the user, the additional information is also acquired and provided according to the information acquiring command.

According to the invention, necessary information on printer maintenance or an updating of software is notified to the user as the additional information added to the print result which is generally notified to the user upon completion of printing. The additional information is notified to the user upon completion of printing when execution of printing is intentionally instructed by the user to activate the printing application by the application binding command.

An application intentionally executed is not interrupted by an unintentional acquisition of information in another application (the printing application 20 or another information acquisition application) activated in the foreground via a regular process of polling. Necessary information on printer maintenance or an updating of software is notified to the user as the additional information without giving uncomfortable feeling by an unintentional change of screen displays.

Figure 4:
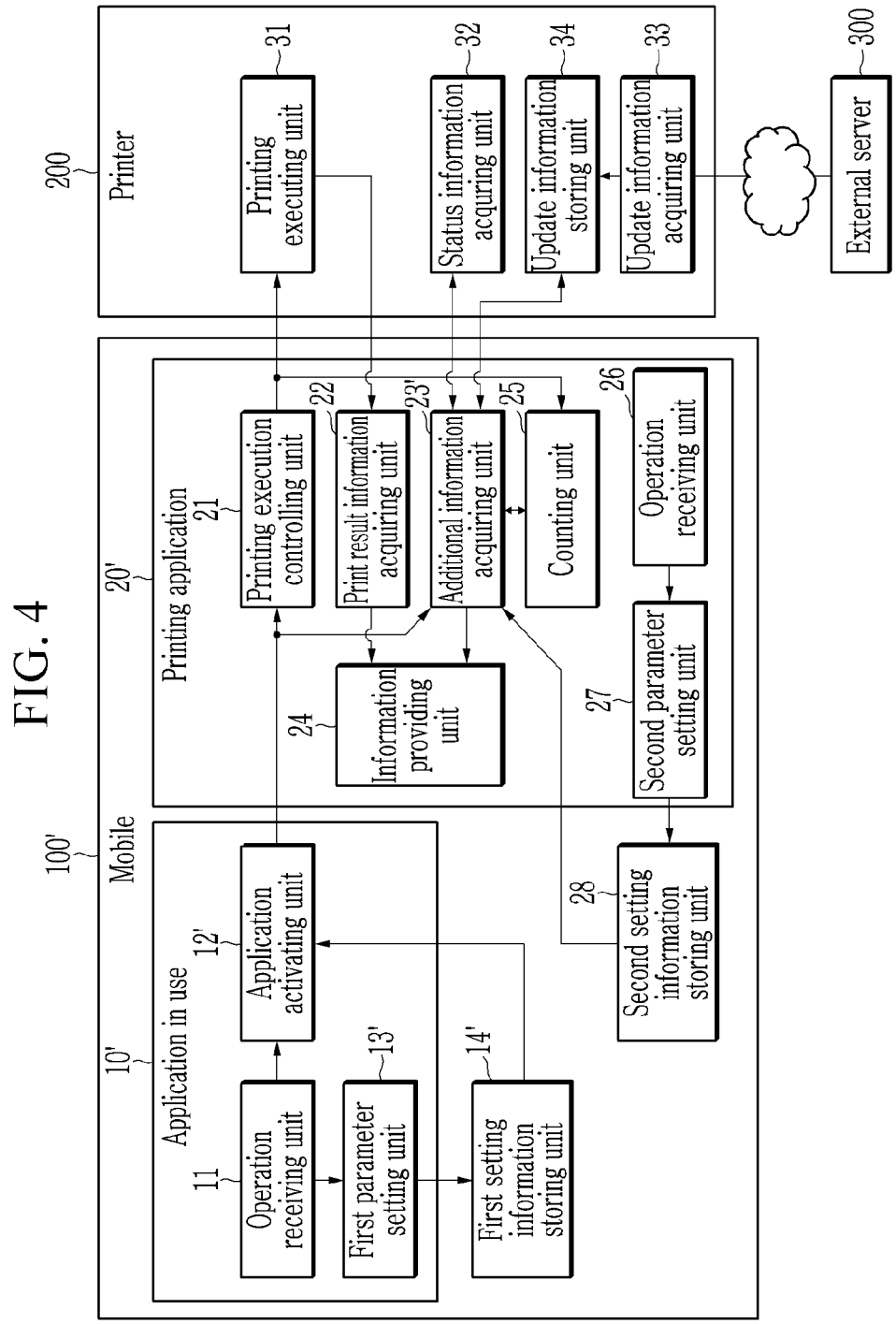
FIG. 4 is a functional block diagram of a printing system using an information providing system of a modified embodiment.

The scope of the invention is not limited to the embodiment where the frequency of acquisition is designated by the information acquiring command included in the application binding command issued by the application activating unit 12 of the application in use 10. Instead, the frequency of acquisition may be designated on the screen display of the mobile 100, for example, on a dedicated page activated by the printing application 20. FIG. 4 is a functional block diagram of a printing system using an information providing system of a modified embodiment. Any component having the same symbol as FIG. 2 has the same function, of which explanation is being omitted.

In a modified embodiment, an application in use 10' comprises an application activating unit 12' and a first parameter setting unit 13'. A printing application 20' comprises an additional information acquiring unit 23', an operation receiving unit 26, and a second parameter setting unit 27. A mobile 100' comprises a first setting information storing unit 14' and a second setting information storing unit 28.

The first parameter setting unit 13' stores an information acquisition parameter in the first setting information storing unit 14'. The information acquisition parameter is designated by a parameter setting operation. The parameter designated by the first parameter setting unit 13' is a type of information to be acquired, not the parameter of the frequency of acquisition. The first setting information storing unit 14' stores a parameter of the type of information to be acquired.

The application activating unit 12' issues an application binding command designating the printing application 20' and a predetermined information acquiring command according to the information acquisition parameter stored in the first setting information storing unit 14' when a printing execution operation is received by the operation receiving unit 11. The information acquiring command designates the type of information to be acquired, not the frequency of acquisition.

The operation receiving unit 26 of the printing application 20' receives a parameter setting operation for designating the frequency of acquisition. The second parameter setting unit 27 sets the acquisition frequency parameter according to the parameter setting operation received by the operation receiving unit 26. The second parameter setting unit 27 stores the acquisition frequency parameter in the second setting information storing unit 28.

The additional information acquiring unit 23' acquires the additional information on at least one of the printer 200 and the printing application 20' according to the information acquiring command included in the application binding command. What additional information is acquired depends on the content of the information acquiring command. Further, the additional information acquiring unit 23' acquires the additional information as designated by the information acquiring command from the printer 200 when the acquisition frequency parameter is stored in the second setting information storing unit 28 and the accumulated number of sheets or amount of time measured by the counting unit 25 reaches the count value of frequency stored in the second setting information storing unit 28.

The scope of the invention is not limited to the embodiment where the counting unit 25 counts the number of printed sheets. The counting unit 25 may count the frequency of execution of printing.

The scope of the invention is not limited to the embodiment where the additional information acquiring unit 23, 23' provides the information on latest version of printer firmware or the printing application 20, 20' acquired from the printer 200 whenever the information acquiring command for latest version is included regardless of what version is actually installed. Instead, the additional information acquiring unit 23, 23' may provide the information on latest version of printer firmware or the printing application 20, 20' only when it is determined that an updating is required after comparing the installed version and the acquired latest version information.

The scope of the invention is not limited to the embodiment where the information on latest version has been previously acquired by the update information acquiring unit 33 from the external server 300 and stored in the update information storing unit 34. Instead, the information may be acquired just when a request for acquisition is sent from the additional information acquiring unit 23, 23'.

The scope of the invention is not limited to the embodiment where the printer 200 acquires information on latest version of printer firmware and the printing application 20, 20' and then the printing application 20, 20' acquires the information from the printer 200. Instead, the additional information acquiring unit 23, 23' may access the external server 300 to acquire the information just when the application binding command is issued by the application activating unit 12, 12'.

The scope of the invention is not limited to the embodiments where the iOS-based URL scheme is used as an example of the application binding command. The Android-based Intent can be used instead.

The scope of the invention is not limited to the embodiments where the HTML data generated by the application 10, 10' is converted into the raster data to be transmitted to the printer 200. Instead, the raster data may be replaced by any data of various formats including a binary format such as a command unique to the printer and an XML format.

The scope of the invention is not limited to the embodiments. The invention may be embodied in various forms without departing from the scope of the invention.

What is claimed is:

1. An information providing system using a data relaying application comprising a printing application which receives a first data generated by another application executed by a mobile, converts the first data into a second data for printing, and outputs the second data to a printer, the information providing system comprising:
   an application activating unit which issues an application binding command to activate the printing application in response to a print instruction given by a user of the mobile, the application binding command designating the printing application and including a predetermined information acquiring command designated according to an information acquisition parameter set by the user of the mobile;
   a printing execution controlling unit of the printing application which controls execution of printing by the printer;
   a print result information acquiring unit of the printing application which acquires a print result information from the printer, the print result information representing success or failure of the execution of printing:
   an additional information acquiring unit of the printing application which acquires an additional information on at least one of the printer and the printing application according to the predetermined information acquiring command included in the application binding command; and
   an information providing unit of the printing application which provides the mobile with the print result information acquired by the print result information acquiring unit and the additional information acquired by the additional information acquiring unit by displaying the print result information and the additional information together on a screen of the mobile.

2. The information providing system of claim 1, further comprising a status information acquiring unit of the printer which acquires a status information of the printer in response to a request from the printing application according to the predetermined information acquiring command; and
   wherein the additional information acquiring unit acquires the status information acquired by the status information acquiring unit as the additional information.

3. The information providing system of claim 1, wherein the additional information acquiring unit acquires information on a latest version of firmware of the printer according to the predetermined information acquiring command.

4. The information providing system of claim 1, wherein the additional information acquiring unit acquires information on a latest version of the printing application according to the predetermined information acquiring command.

5. An information providing system by a data relaying application comprising a printing application, comprising:
   an application activating unit which issues an application binding command in response to a print instruction of a first data generated by an application executed by a mobile, the application binding command designating the printing application and a predetermined information acquiring command, the printing application being activated to convert the first data to a second data to be output to a printer;
   a printing execution controlling unit of the printing application which controls execution of printing by the printer;
   a print result information acquiring unit of the printing application which acquires a print result information from the printer, the print result information representing success or failure of the execution of printing:
   an additional information acquiring unit of the printing application which acquires an additional information on at least one of the printer and the printing application according to the predetermined information acquiring command included in the application binding command;
   an information providing unit of the printing application which provides the mobile with the print result information acquired by the print result information acquiring unit and the additional information acquired by the additional information acquiring unit; and
   a counting unit of the printing application which counts the number of printed sheets, a frequency of execution of printing, or an elapse of time since the additional information acquiring unit acquires the additional information,
   wherein the application activating unit issues the application binding command including the information acquiring command for designating a frequency of acquisition by the additional information acquiring unit; and
   the additional information acquiring unit acquires the additional information when a count value by the counting unit reaches the frequency of acquisition designated by the information acquiring command.

6. An information providing system by a data relaying application comprising a printing application, comprising:
   an application activating unit which issues an application binding command in response to a print instruction of a first data generated by an application executed by a mobile, the application binding command designating the printing application and a predetermined information acquiring command, the printing application being activated to convert the first data to a second data to be output to a printer;
   a printing execution controlling unit of the printing application which controls execution of printing by the printer;
   a print result information acquiring unit of the printing application which acquires a print result information from the printer, the print result information representing success or failure of the execution of printing:
   an additional information acquiring unit of the printing application which acquires an additional information on at least one of the printer and the printing application according to the predetermined information acquiring command included in the application binding command;
   an information providing unit of the printing application which provides the mobile with the print result information acquired by the print result information acquiring unit and the additional information acquired by the additional information acquiring unit;
   a counting unit of the printing application which counts the number of printed sheets, a frequency of execution of printing, or an elapse of time since the additional information acquiring unit acquires the additional information; and a parameter setting unit of the printing application sets a parameter of a frequency of acquisition by the additional information acquiring unit in response to a user operation, wherein the additional information acquiring unit acquires the additional information when a count value by the counting unit reaches the frequency of acquisition designated by the parameter setting unit.

* * * * *